Sept. 13, 1966

E. L. SCHLAGE

MAGNETIC LOCKING DEVICE AND METHOD OF COMBINATING THE SAME 3,271,983

Filed July 14, 1964

5 Sheets-Sheet 1

INVENTOR.
ERNEST L. SCHLAGE

BY Gordon Wood

ATTORNEY

Sept. 13, 1966 E. L. SCHLAGE 3,271,983

MAGNETIC LOCKING DEVICE AND METHOD OF COMBINATING THE SAME

Filed July 14, 1964 5 Sheets-Sheet 2

INVENTOR.
ERNEST L. SCHLAGE

BY Gordon Wood.

ATTORNEY

Sept. 13, 1966 | E. L. SCHLAGE | 3,271,983

MAGNETIC LOCKING DEVICE AND METHOD OF COMBINATING THE SAME

Filed July 14, 1964 | 5 Sheets-Sheet 3

INVENTOR.
ERNEST L. SCHLAGE
BY Gordon Wood
ATTORNEY

INVENTOR
ERNEST L. SCHLAGE
BY
Gordon Wood.
ATTORNEY

Sept. 13, 1966
E. L. SCHLAGE
MAGNETIC LOCKING DEVICE AND METHOD
OF COMBINATING THE SAME
3,271,983
Filed July 14, 1964
5 Sheets-Sheet 5

INVENTOR.
ERNEST L. SCHLAGE
BY
Gordon Wood
ATTORNEY 3,271,983
MAGNETIC LOCKING DEVICE AND METHOD OF COMBINATING THE SAME Ernest L. Schlage, Burlingame, Calif., assignor to Schlage Lock Company, a corporation
Filed July 14, 1964, Ser. No. 382,548
33 Claims. (Cl. 70—276)

This invention relates to locking devices and more particularly to locking devices of the type wherein the force of a magnetic field is employed to lock and unlock a movable element. Examples of prior art patents directed to the general type of locking devices contemplated herein are Cooley Patent No. 2,566,017 and Noregaard Patents No. 2,648,729 and No. 2,732,703.

In general, magnetic locks usually comprise a movable slide that is normally held in locked position by one or more locking members adapted to be shifted to unlocking position by the influence of magnetic material brought into close proximity with the locking members. It will be apparent that whether the movable slide is adapted to be shifted to open or close a switch or to actuate an associated mechanism the apparatus for locking and unlocking the slide can be considered as a complete device without regard to the particular function which the movement of the unlocked slide performs. Although the present invention will be illustrated by one embodiment wherein the movement of the normally locked slide retracts the latch bolt of a conventional door lock it will be apparent that the invention contemplates other uses including the actuation of switches and other mechanisms.

The main object of the present invention is the provision of a magnetic locking device which constitutes an improvement over prior art devices of like nature.

Another object of the invention is the provision of a magnetic lock which is relatively inexpensive to build and which efficiently employs known principles of magnetism to provide a positive locking and unlocking operation within a relatively small space.

Still another object of the invention is the provision of a locking device which employs locking elements that may be arranged in very closely adjoining relationship thus saving space and increasing the number of combinations possible in the space available.

Yet another object of the invention is the provision of a novel method of combinating a lock so that the one apparatus may be readily adapted to reject a previously used key and accept a new key.

Other objects and advantages will be apparent from the following specification and from the drawings wherein.

Figure 1:
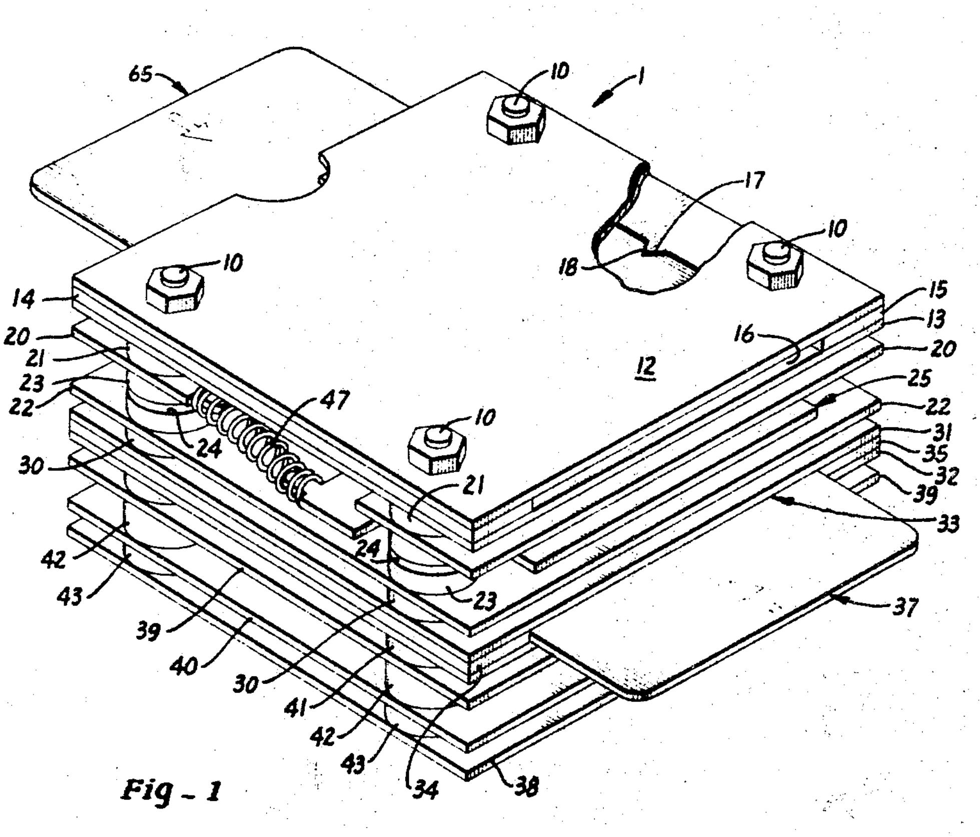
FIG. 1 is a perspective of the preferred form of mechanism incorporating the invention.
Figure 3:
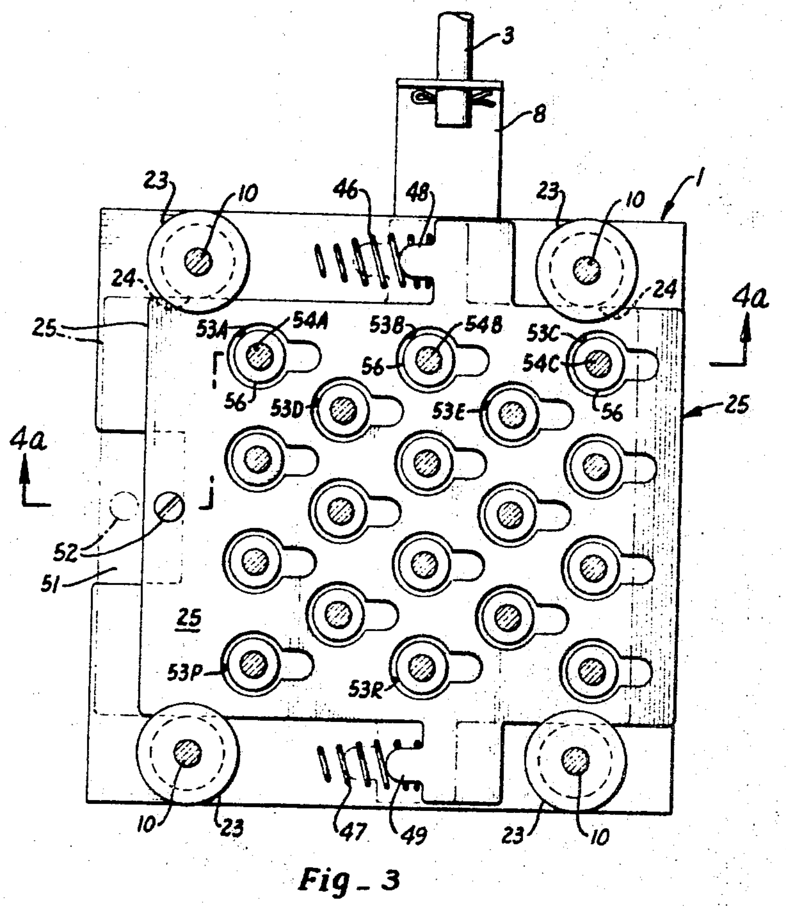
FIG. 3 is a horizontal sectional view through the mechanism of FIG. 1 taken in a plane indicated by lines 3—3 of FIG. 4*a*.
Figure 4A:
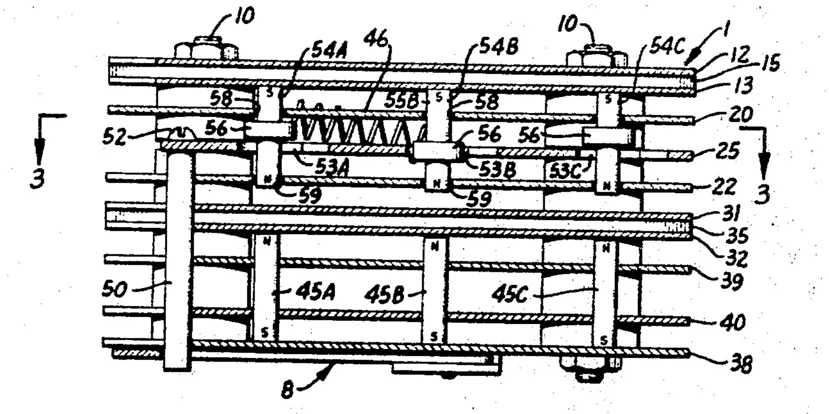

FIG. 4*a* is a vertical cross section of the device of FIG. 1 as taken in a plane indicated by lines 4*a*—4*a* of FIG. 3.

Figure 4B:
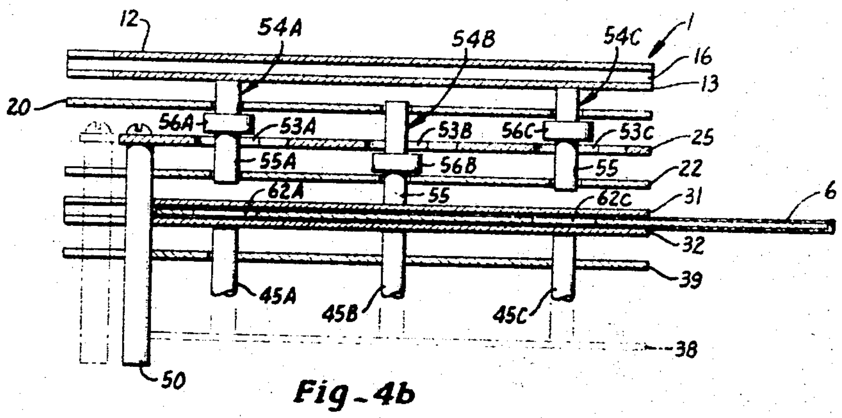

FIG. 4*b* is a view similar to FIG. 4*a* showing the manner in which a correct key card shifts a magnet which normally locks the device to an unlocking position.

Figure 4C:
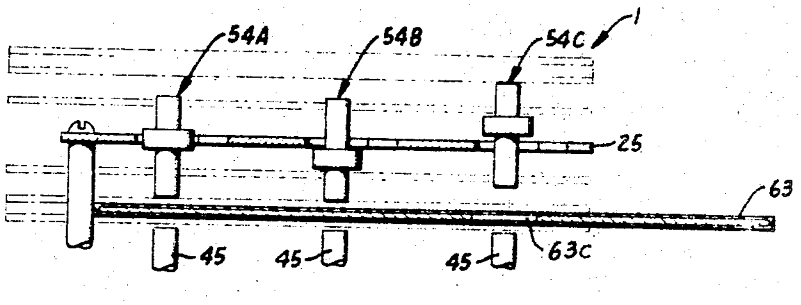

FIG. 4*c* is a view similar to FIG. 4*a* showing the manner in which one form of incorrect key card shifts a magnet from a normal unlocking position to a locking position.

Figure 4D:
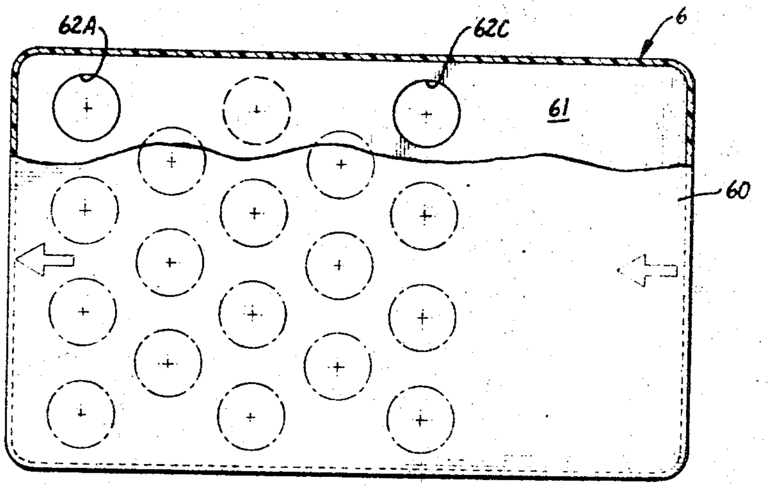

FIG. 4*d* is a plan view of the correct card key of FIG. 4*b*.

Figures 5A, 5B, 5C, 5D, 5E, 5F, 5G:
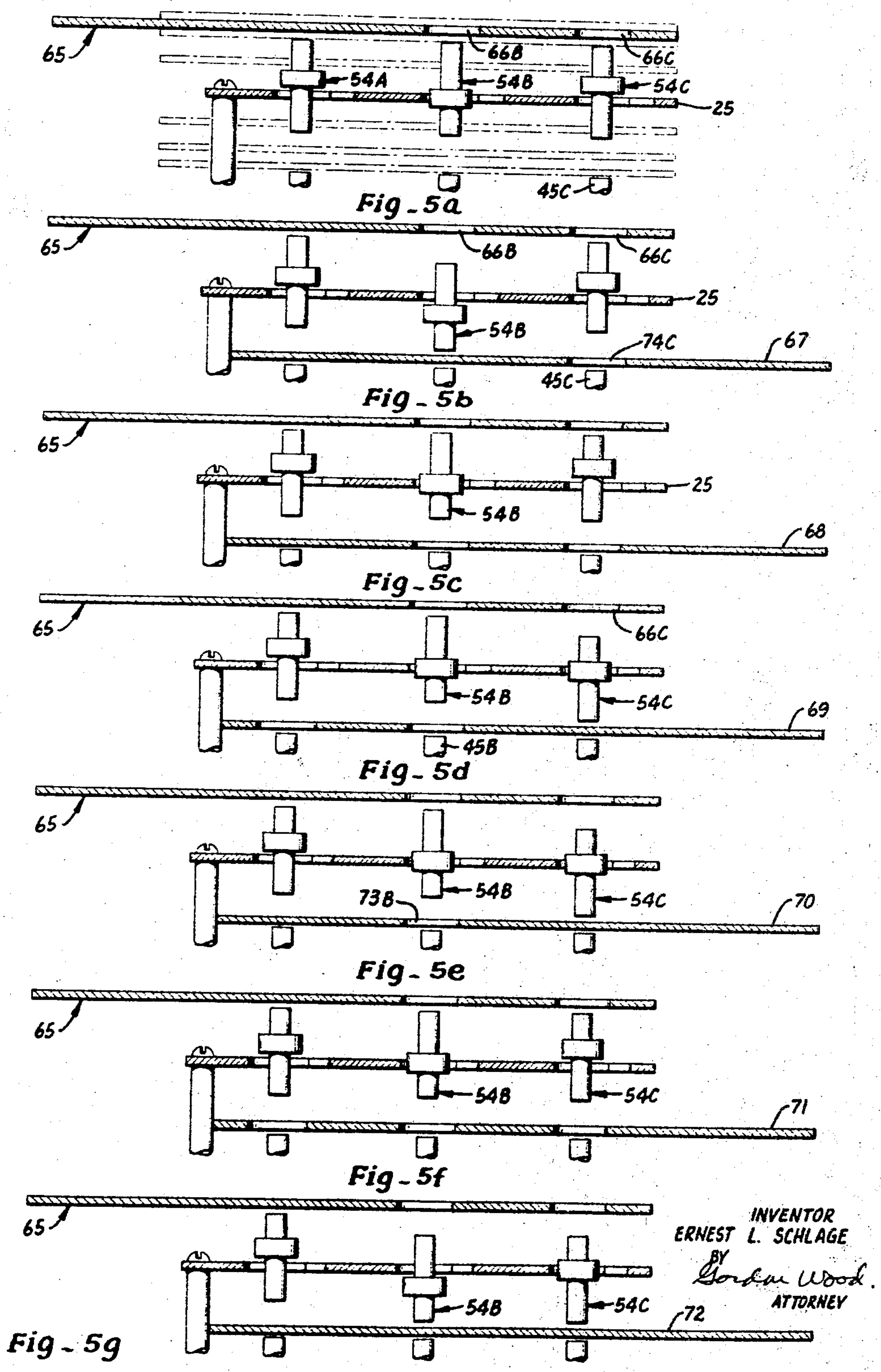

FIG. 5*a* is a view similar to FIG. 4*a* but with a combinating card inserted in the device.

FIG. 5*b* is a view similar to FIG. 5*a* showing the manner in which a correct card key unlocks the mechanism.

FIGS. 5*c*–5*g* show schematically the effect of some wrong card keys on the combinated device of FIG. 5*a*.

Figure 5H:
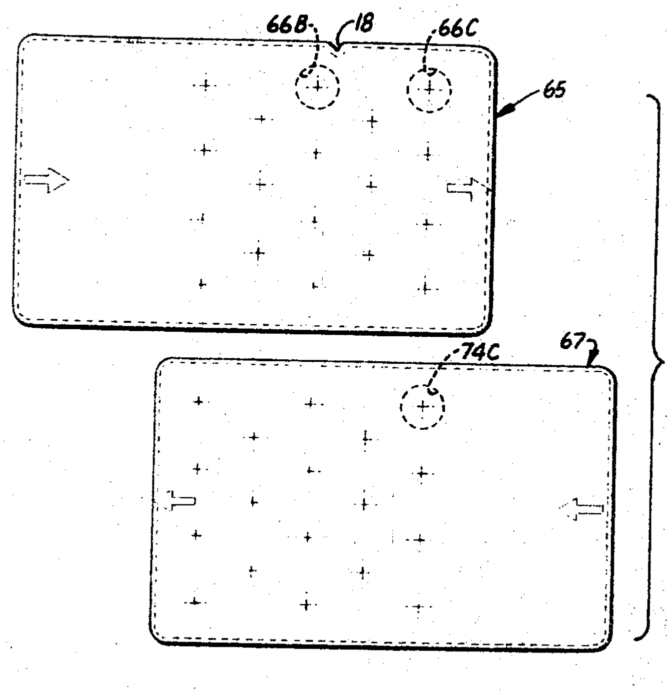

FIG. 5*h* is a plan view of the correct card key of FIG. 5*b* in combination with the combinating card.

Figure 6:
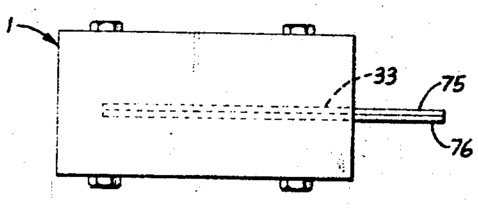

FIG. 6 is a reduced side elevation of a construction similar to FIG. 4*a* but employing two superposed card keys.

Figure 7:
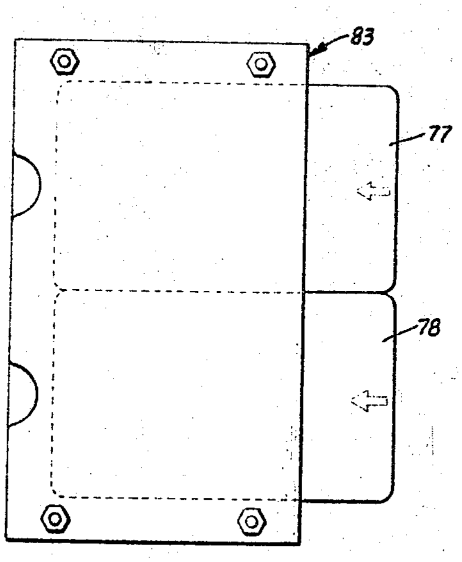

FIG. 7 is a top plan view showing the use of two card keys side by side to effect opening of the lock.

Figure 8:
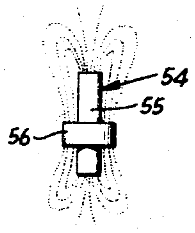

FIG. 8 is a semischematic side elevation of one of the movable magnets showing the manner in which the collar draws the magnetic lines of force inwardly.

Figure 9:
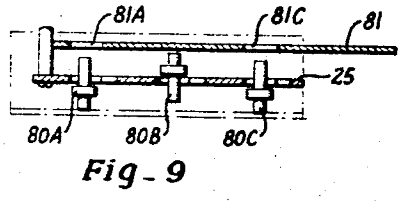

FIG. 9 is a reduced semischematic side elevation partly in section of a modified form of the invention wherein gravity is employed to urge the movable magnets to their normal positions.

Figure 2:
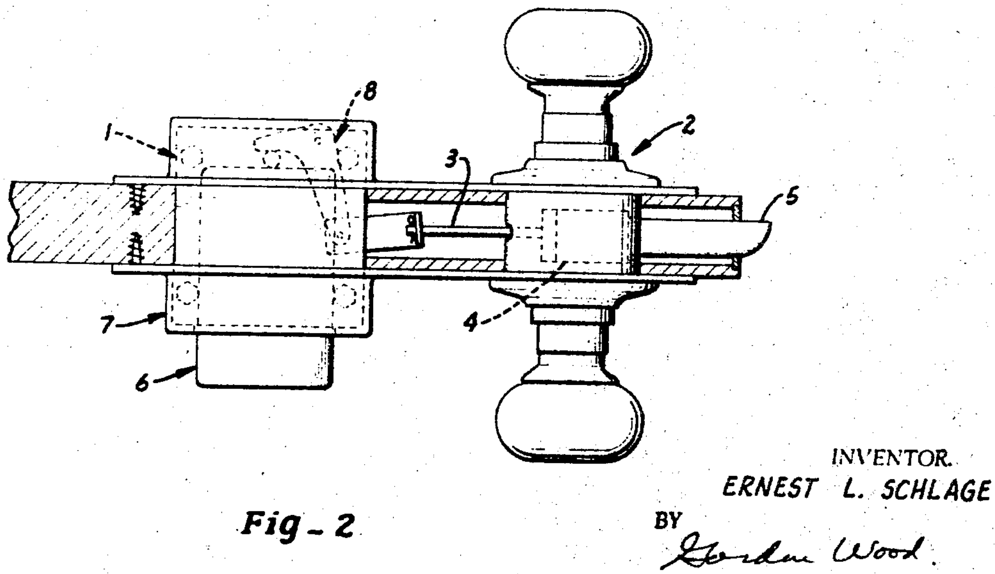
FIG. 2 is a reduced scale horizontal sectional view through a door showing one method of actuating a lockset by means of the mechanism of FIG. 1.

The locking mechanism of the present invention is generally designated 1 in FIGS. 1 and 2 and one application of the mechanism is illustrated in FIG. 2 wherein a conventional lockset generally designated 2 is connected by means of a rod 3 to the magnetic locking mechanism 1. The lockset 2 includes a slide 4 that is operatively connected with the latch bolt 5 so that upon movement of the rod 3 to the left (FIG. 2) corresponding movement of the slide 4 and latch bolt results. The actuation of the mechanism 1 is achieved in the particular embodiment of FIG. 2 by means of a card generally designated 6 which is passed through a suitable opening in a housing 7 and into the mechanism 1 so that inward pressure of card 6 actuates a linkage 8 to retract the latch bolt 5.

With reference to FIG. 1 the mechanism 1 comprises a stack of spaced apart plates formed of nonmagnetic material, such as brass, and connected together by means of four bolts 10 or other suitable fastening elements.

Said stack of plates includes a top plate 12 and a stop plate 13 which is spaced downwardly from top plate 12 by means of a pair of guide strips 14, 15 extending along the longitudinal margins of the plates 12, 13 so as to define a longitudinally extending passageway 16 therebetween. For the purpose of properly positioning a card within passageway 16 the guide strip 15 is provided with an inwardly directed projection 17 which is adapted to cooperate with a complementarily formed notch 18 (FIG. 5*h*) in a card 65, to be described, so as to position such card in a predetermined position relative to the device 1 regardless of whether such card is inserted in the passageway 16 from one end of the device or from the other end.

Spaced downwardly from the stop plate 13 is a bearing plate 20 which is spaced from said stop plate 13 by four disk-like spacers 21 through which the bolts 10 extend. Spaced downwardly from bearing plate 20 is another bearing plate 22 which is positioned in a predetermined fixed position relative to bearing plate 20 by relatively long spacers 23 that are provided with annular grooves 24 centrally between their ends and which grooves 24 constitute guides for slidably supporting therein a movable plate or slide generally designated 25. As will subsequently be seen the slide 25 is adapted to be shifted from a locked to an unlocked position in a direction longitudinally of the mechanism 1.

Spaced downwardly from lower bearing plate 22 by means of spacers 30 is a lower stop plate 31 which cooperates with another plate 32 to define a longitudinally extending passageway 33. Passageway 33 is defined also by guide strips 34, 35 similar to guide strips 14, 15 above described. The passageway 33 is adapted to receive therein a card key generally designated 37.

Between plate 32 and the bottom plate 38 of the mechanism are a pair of vertically spaced apart support plates 39, 40. Plates 32 and 39 are spaced apart by means of spacers 41 and plates 39, 40 are spaced apart by spacers 42 and the bottom plate 38 is spaced from the plate 40 by means of spacers 43.

As best seen in FIG. 4*a*, a plurality of fixed magnets 45 are positioned between bottom plate 38 and fixed plate 32, and the support plates 39, 40 are apertured to receive the magnets 45 therethrough so that said magnets may be accurately fixed in predetermined positions relative to the remainder of the mechanism 1.

Referring now to FIG. 3, the movable plate or slide 25 is supported for reciprocation in the annular grooves 24 formed in the four spacers 23 interposed between plates 20, 22. Slide 25 is adapted to move from its normally locked position shown in full lines to the left to the dot dash line position indicated in FIG. 3. The slide 25 is urged to the right (FIG. 3) by means of a pair of compression springs 46, 47 which are retained at one of their corresponding ends by projections 48, 49 formed on slide 25. The other ends of springs 46, 47 are in abutment with similar projections formed on bearing plate 20 (FIG. 1). The slide 25 is held in its right hand position of FIG. 3 by means of a vertically extending pin 50 which is secured at its upper end by screw 52 to the slide 25 and which is in engagement along its length with the various fixed plates which are under slide 25. Said lower plates are provided with relatively large notches to define a vertically extending passageway 51 (FIG. 3) in which pin 50 may move. When shifting of the slide 25 from its locked position of FIG. 3 to the left is permitted it will be apparent that pin 50 moves within said passageway 51. After such movement to the left the slide 25 is, of course, yieldably urged to its normally locked position by means of springs 46, 47.

The slide 25 is provided with a plurality of apertures 53 through which extend a plurality of corresponding movable magnets 54. As best seen in FIG. 8, each magnet 54 comprises an elongated pin 55 preferably formed of a material of good magnetic qualities such as "Alnico." Intermediate the ends of each pin 55 is a collar 56 which may either be fixedly secured to pin 55 by a press fit or may be integrally formed with pin 55. The mechanical advantages of the type of magnet shown in FIG. 8 will be seen later on, but at this point it may be noted as shown in FIG. 8 that the effect of collar 56, which is preferably formed of soft steel, is to restrict the lines of force of the magnet to paths closely adjacent the pin 55 so that there is little or no influence from magnet 54 at points spaced even a relatively short distance from the longitudinally extending center line of magnet 54. This result permits a greater number of magnets to be used within a given space.

As best seen in FIG. 4*a*, the magnets 54 are reciprocally supported within apertures 58, 59 in bearing plates 20, 22 respectively. At this point it may also be noted that the magnets 54 each have an upper position in engagement with the upper stop plate 13 and a lower position in engagement with the lower stop plate 31. As best seen in FIG. 4*a*, the preferred form of the invention incorporates the use of fixed magnets 45 which have the effect of repelling the movable magnets 54 to the upper positions of the latter in abutment with upper stop plate 13.

Referring to FIG. 3 it is seen that the apertures 53 in slide 25 through which the movable magnets 54 extend are similar to keyhole slots in that they include a relatively large circular portion and a short portion extending longitudinally of the slide 25. It will be apparent from a consideration of FIGS. 3 and 4 that when the collar 56 is within the enlarged portion of the aperture 53 the slide 25 is locked against any appreciable movement to the left. However, when the collars 56 of the magnets are spaced upwardly or downwardly from the slide 25 it will be seen that the pin portion 55 of the magnets 54 may be accepted in the relatively narrow slot portion of the apertures 53 thus permitting movement of the slide 25. For example in FIG. 4*a* it is seen that magnets 54A and 54C are out of locking relation with slide 25 whereas magnet 54B is in locking relation since the collar 56 of magnet 54B is within the enlarged circular portion of the associated aperture 53B.

By the present invention it is contemplated that a magnet 54 is operatively associated with each of the apertures 53 shown. There are eighteen apertures and eighteen magnets shown in FIG. 3 but it will be apparent that this number is only by way of example and a greater or lesser number of interengaging elements may be employed if desired. However, it will be noted that only one of the magnets 54 need be in locking relation with the slide 25 in order to prevent movement of the latter. In the example shown in FIG. 4*a* it will be seen that the magnet 54B is formed so that its collar 56 is nearer the lower end of pin 55B than the upper end. On the other hand, the collars 56 of magnets 54A and 54C are near the upper ends of the associated pins. In other words, magnets 54A and 54C are normally in unlocking relation with slide 25 while magnet 54B is normally in locking relation with said slide.

For the purpose of describing the operation of the invention a simplified arrangement of magnets is described wherein only three of the magnets of the eighteen shown in FIG. 3 are involved. It will be understood, however, that a relatively large number of different arrangements may be provided wherein a key adapted to operate one installation will not operate another. Furthermore, a method of combinating the device will subsequently be described to illustrate the flexibility and adaptability of the lock to practical requirements. Considering the simplified example of FIG. 4 there is illustrated in FIG. 4*d* the card key generally designated 6 hereinbefore referred to, which card includes a plastic envelope 60 which completely envelops an inner sheet 61 of steel or other suitable magnetic material and which sheet 61 is adapted to be punched with holes (for example holes 62A and 62C). When the card 6 is inserted through passageway 33 and into engagement with pin 50 holes 62A and 62C register respectively with the axes of fixed magnets 45A and 45C. It will be understood that the fixed magnets 45 are in coaxial alignment with the pins 55 of the corresponding movable magnets so that the apertures 62A and 62C of card key 6 are brought into concentric relationship with the common axis of the fixed magnets 45A, 45C and the corresponding movable magnets 54A and 54C. With respect to the specific example of FIG. 4*b*, the effect of card 6 is to interrupt the magnetic field from fixed magnet 45B which normally repels the movable magnet 54B into its upper locking relationship with slide 25. The steel in plate 61 provides a low resistance path for the lines of force of both fixed magnet 45B and movable magnet 54B and urges the latter downwardly against stop plate 31 thereby removing the collar 56B from the aperture 53B. However, it will be noted that the apertures 62A and 62C do not interfere with the fixed magnetic fields of fixed magnets 45A and 45C respectively which retain the unlocked magnets 54A and 54C in their normal unlocking condition. In this connection it will be seen from FIG. 4*c*, wherein card 63 is formed with only one aperture 63C, magnet 54A is moved to locking position and slide 25 remains locked despite the fact that normally locking magnet 54B has been moved to unlocking position and despite the fact that aperture 63C prevents locking of magnet 54C.

It is emphasized that the arrangement of FIG. 4*a* represents a greatly simplified form of the invention and would probably never be applied as a practical matter since, having eighteen magnets available for use, it is preferable to employ substantially more than three active magnets and a plurality of normally locked magnets and a relatively large number of normally unlocked magnets which may be drawn into locking position by the wrong card key.

One of the advantages of the present invention is the fact that the same may be operated in any position and it is not necessary that the fixed magnets be below the movable magnets. In this connection if the device were inverted gravity contributes to the forces necessary to move the movable magnets to their normal positions.

If the device of FIG. 4*a* is inverted it will be apparent that gravity holds the movable magnets in their normal position. For example in FIG. 9 no fixed magnets are employed and the movable magnets 80 are urged from their lower normal positions by those portions of card key 81 that are provided with magnetic material. Thus magnet 80B is urged upwardly into unlocking relation with slide 25 by its force of attraction to the adjacent steel of card key 81. On the other hand, movable magnets 80A, 80C remain in their unlocking positions because card key 81 is provided with apertures 81A, 81C coaxial with the axes of said movable magnets 80A, 80C.

One of the important features of the present invention is the fact that the device lends itself to a simple method of combinating the lock and also makes it a very easy matter to change from one combination to another. As pointed out above in connection with the description of FIG. 1, the passageway 16 is adapted to receive therein a combinating card 65 (FIG. 5*h*). This combinating card 65 may readily be slipped into passageway 16 and by registering the projection 17 on guide 15 with the notch 18 the card 65 may be positioned so that apertures 66 formed therein register with corresponding magnets 54. For example, as an illustration, apertures 66B and 66C are shown in FIG. 5*h* and said apertures register with movable magnets 54B and 54C. With the magnets 54A, 54B and 54C in the same locking position as in the illustration in FIG. 4*a* it will be seen that the aperture 66C has the effect of releasing magnet 54C since there is insufficient attractive force between card 65 and magnet 54C to hold said magnet 54C against movement to a locking position under the influence of steel in an associated card key. It will be noted that the only aperture in card 67 (FIG. 5*b*) is aperture 74C. As seen in FIG. 5*b*, the effect of the combination of combinating card 65 and the proper card key 67 is to unlock slide 25 by moving magnet 54B out of interlocking engagement with said slide because of the presence of the steel in card key 67 adjacent said movable magnet 54B; such movement being permitted because combinating card 65 is not provided with metal adjacent magnet 54B but rather with the aperture 66B. It will be seen from a consideration of FIGS. 5*c* through 5*g* that an improper card will not operate the lock. For example, wrong card 68 in FIG. 5*c* does not affect the normally locked magnet 54B. In FIG. 5*d* a wrong card 69 has the effect of attracting magnet 54C from its unlocking to its locked position; this being permitted because of the presence in combinating card 65 of the aperture 66C which does not prevent the magnet 54C from being attracted into locking engagement by the influence of the adjacent metal in card 69. With the wrong card 70 in FIG. 5*e* magnet 54C is again attracted into locking position and, in addition, magnet 54B is not moved from its normal locking position because of the presence of aperture 73B in card 70. It will also be noted that the wrong card 71 in FIG. 5*f* is provided with apertures at each of the three magnets so that the same result obtains as in FIG. 5*c*. The wrong card 72 in FIG. 5*g* attracts magnet 54C into locking engagement although the normally locking magnet 54B is attracted out of locking engagement. It will be noted in the various views of FIG. 5 that magnet 54A is not affected by any card since it is attracted to unlocking position by the greater force caused by the presence of the adjacent metal in card 65. However, it will be understood that magnet 54A may be released for operation, if desired, by employing a combinating card having an aperture in association therewith.

An important feature of the invention can be seen from FIGS. 5*f* and 5*g* wherein it will be noted that both the absence of metal and the presence of metal at all positions of the magnets will cause the slide 25 to remain in locked position. This prevents activation of the lock by any member of solid material.

In view of the combinations permitted by only three of the magnets 54 as above described it will be apparent that a greater number of magnets such as the sixteen shown in the example of FIG. 3 permits an extremely large number of combinations to be effected so that different installations may be given different combinations. Furthermore, the simple structure of the magnets 54 wherein a difference in effect is achieved merely by different positioning of the collar 56 permits a very simple assembly and makes it easy to combinate the mechanism in any predetermined manner. With the polarity of the fixed magnets 45 and the movable magnets 54 as shown in FIG. 4*a* it will be apparent that it is merely necessary to provide two different types of movable magnets, one type with the collar 56 adjacent the south pole and the other with the collar 56 adjacent the north pole. Selection of the particular positioning required to give the combination desired becomes a very simple matter.

Another main advantage of the present invention is the fact that the mechanism operates regardless of the manner in which it is supported. For example, with reference to FIG. 4*a*, it will be apparent that the fixed north poles repel the north poles of the magnets 54 whether the structure is shown as indicated in FIG. 4*a* or inverted so that the north poles of fixed magnets 45 are above the movable magnets 54. In the latter case it will be noted that gravity also assists in moving the movable magnets 54 to their normal position.

It will be understood that the use of the combinating card 65 in FIG. 5 permits an extremely simple and effective method of changing the combination of the lock so that a card key which might operate the mechanism at one time will not operate it at another time with a different combinating card 65 in place. This permits the proprietor of an establishment to lock out people who have previously had authority to use the associated service or gain entrance to an area affected. The relative simplicity of this combinating means compared to the operation of changing the combination of a pin tumbler lock, for example, will be apparent.

The flexibility of the present invention permits various methods of usage depending upon the particular situation involved. For example, in some circumstances, such as safety deposit boxes, it is desirable to require the use of two card keys to gain entrance to the box. In such a case the bank or other establishment may be provided with a card and the lessee of the box with a different card so that when both cards, for example 75, 76 (FIG. 6) are superposed within the passageway 33 of the mechanism the effect on the movable magnets is to unlock the slide. However, the use of one or the other only of the two cards 75, 76 does not permit unlocking of the mechanism. Another arrangement similar to that of FIG. 6 is shown in FIG. 7 wherein the passageway of the device 83 is sufficiently wide to permit the insertion of cards 77, 78 in said passageway in side by side relationship as indicated.

It will be apparent that the use of the combinating card may be modified to require more than one to meet the needs of a particular installation.

It will also be noted from FIG. 4*a* that in lieu of the plurality of fixed magnets 45 one single stationary magnet may be employed in the form of a block (not shown). The use of such a block is desirable in situations where it is necessary to economize on space since the vertical dimension of the mechanism would not need to be as great as that required when isolated fixed magnets 45 are used.

Although the above described examples of card keys incorporate the use of a steel plate with perforated holes in order to provide areas of different magnetic qualities, it will be apparent that a reverse type of card may be employed; that is, one in which the card is made of plastic and provided with a plurality of disk-like sections of steel or other magnetic material in order to obtain the desired differences in magnetic properties. The present invention, of course, contemplates such a plastic card with steel inserts.

Although the particular mathematical scheme employed by the manufacturer to set up the lock for different installations may take different forms, one effective method of arranging the magnets of FIG. 3 is as follows: the eighteen magnets may be divided into two groups of nine each so that one group may be employed to effect different combinations for different installations and the other group may be employed to effect different combinations within the one installation. By arranging the first mentioned group with four magnets in normally locking position and five in normally unlocked position 126 different arrangements are possible to provide for the same number of installations.

When a combinating card is employed the second group may be arranged with all magnets in unlocked position so that the combinating card may be formed to permit four of such magnets to be released for locking, and at the same time the card key may be formed to prevent movement of such four magnets to locking position.

By the above described arrangement 126 different installations can be supplied each with its own noninterchangeable locking system and each of these installations may have 126 different combinations.

It should be noted that when one combination changing card is removed and another substituted, any one or more of four conditions may prevail: (1) A key which operated before, no longer operates; (2) a key which did not operate before, now operates; (3) a key which operated before, continues to operate; and (4) a key which did not operate before, still does not operate.

The invention therefore provides a lock which may readily be masterkeyed. That is, a master key card may easily be designed which is adapted to operate a relatively large number of different locks each of which has an associated card key which does not operate any one of the other locks.

The very specific descriptions given above of preferred forms of the invention should not be taken as restrictive as it will be apparent that various modifications in design may be resorted to by those skilled in the art without departing from the scope of the following claims.

I claim:

1. A magnetic lock comprising:
a frame,
a movable member of magnetizable material, means supporting said member for movement along an axis fixed relative to said frame between two extreme positions,
a generally planar slide supported for movement along a path of travel in the plane of said slide and at right angles to said axis,
interengaging elements on said member and slide respectively and adapted to coact to lock said slide against movement when said member is in one of said extreme positions, said interengaging elements being out of engagement to unlock said slide when said member is in the other of said extreme positions to permit movement of said slide.

2. A magnetic lock comprising:
a frame,
a movable member of magnetizable material, means supporting said member for movement along an axis fixed relative to said frame between two extreme positions,
a generally planar slide supported for movement along a path of travel in the plane of said slide and at right angles to said axis,
interengaging elements on said member and slide respectively and adapted to coact to lock said slide against movement when said member is in one of said extreme positions, said interengaging elements being out of engagement to unlock said slide when said member is in the other of said extreme positions to permit movement of said slide,
said member being a magnet and there being a fixed magnet spaced from said movable magnet and repelling said movable magnet to one of said two positions.

3. A lock according to claim 2 which includes a card key adapted to be interposed between said fixed and movable magnets and provided with magnetic material at said axis to cause movement of said movable magnet toward said material to one of said extreme positions.

4. A magnetic lock comprising:
a frame,
a movable magnet supported for movement along an axis fixed relative to said frame between two extreme positions,
positive stop means engageable with said magnets at said extreme positions,
a generally planar slide supported for movement along a path of travel in the plane of said slide and at right angles to said axis,
interengaging elements on said magnet and said slide respectively and adapted to coact to lock said slide against movement when said magnet is in one of said extreme positions, said interengaging elements being out of engagement to unlock said slide when said magnet is in the other of said extreme positions to permit movement of said slide,
magnetic means for moving said magnet to one extreme position,
said magnet being movable to the other of said extreme positions when the effect of said magnetic means has been removed.

5. A magnetic lock comprising:
a frame,
a pair of movable magnets supported for movement along parallel axes fixed relative to said frame,
stop means for limiting movement of each of said magnets between two extreme positions,
a generally planar slide supported for movement along a path of travel in the plane of said slide and at right angles to said axes,
interengaging elements on each of said magnets and on said slide respectively and adapted to coact to lock said slide against movement when one of said magnets is in an extreme position in locking relation with said slide, and adapted to permit movement of said slide when both of said magnets are in an extreme position in unlocking relation with said slide,
one of said pair of magnets being normally in one of said extreme positions in locking relation with said slide and the other of said pair of magnets being normally in an extreme position in unlocking relation to said slide,
separate magnet means for urging all of said magnets to one extreme normal position.

6. A lock according to claim 5 wherein a combination card is positioned adjacent one of the corresponding ends of said magnets and provided with an area of magnetic material for holding said normally unlocking magnet in unlocking position.

7. A lock according to claim 6 wherein a card key is positioned adjacent the other corresponding ends of said magnets and provided with an area of magnetic material for attracting said normally locking magnet to its other extreme position in which it is in unlocked relation to said slide, said combination card being formed to provide an area of nonmagnetic material adjacent said normally locking magnet to so permit movement of the latter to unlocking relation.

8. In a magnetic lock of the type in which a plurality of magnets are supported for movement along parallel axes and are adapted to coact with a movable slide for locking and unlocking such slide, a first removable card key adapted to be positioned perpendicular to said axes for influencing the movement of said magnets, a second removable card key adapted to coact with said magnets and said first card key for influencing said magnets in a manner different from the influence of said first card key alone.

9. A lock according to claim 8 wherein said first card key is positioned adjacent one of the corresponding ends of said magnets and the second card key is positioned adjacent the other corresponding ends of said magnets.

10. A lock according to claim 8 wherein said first and second card keys are positioned alongside each other in substantially coplanar relationship.

11. A lock according to claim 8 wherein said first and second card keys are positioned alongside each other in closely adjacent parallel relationship.

12. In a magnetic lock:

a movable slide, a plurality of magnets each supported for movement between two positions, at least one of said magnets having a normal position coacting with said slide to lock the same and being movable to the other position in unlocking relation to said slide, at least one of said magnets having a normal position in unlocking relation relative to said slide and movable to a locking position relative thereto, magnetic means urging said magnets to one normal position, a first card key adapted to be positioned in a predetermined position relative to to said magnets and including an area of magnetic material adjacent said one unlocking magnet for holding the latter in unlocking position, a second card key adapted to be positioned in a predetermined position relative to said magnets and including an area of magnetic material adapted to attract said one locking magnet from its normal position to its other position unlocking said slide, said first card key being provided with an area of nonmagnetic material adjacent said locking magnet to permit said movement to unlocking position.

13. A magnetic locking device for use with a card type key comprising, in combination:

a frame defining a planar field of areas arranged in a predetermined pattern, a planar slide slidably supported in said frame for movement along a path of travel in the plane of said slide and provided with a plurality of areas corresponding to the area of said frame, a plurality of elongated magnets supported in said frame at certain of said areas for axial movement between two extreme positions perpendicular to said plane and along paths of travel fixed relative to said frame, said slide and said magnets being respectively provided with interengaging elements with the element of each of said magnets being in locking relation with the corresponding interengaging element of said slide in one extreme position of said magnet and being out of locking relation relative to said slide in the other extreme position, repulsion magnet means at one of the corresponding ends of said magnets for urging all of said magnets to a normal extreme position with at least one of said magnets in locking relation to said slide and with at least one of said magnets in nonlocking relation, a combinating card adjacent the opposite corresponding ends of said magnets and including an area of magnetic material adjacent said one nonlocking magnet for holding the latter in unlocking relation relative to said slide, a card key interposed between said repulsion magnet means and said magnets and including an area of magnetic material adjacent said locking magnet for attracting the latter to a nonlocking position, said combinating card being provided with nonmagnetic material at the area adjacent said normally locking magnet whereby the latter is not held by said combinating card and is permitted to be so attracted to nonlocking position by said card key.

14. A device according to claim 13 wherein the interengaging elements of said magnets are enlarged portions intermediate the ends thereof, and the interengaging elements of said slide are the edges of openings formed therein and through which said openings said magnets extend, said slide being provided with recesses communicating with said openings, said recesses being of sufficient size to receive therein the portion of said magnets adjacent said enlarged portions but of insufficient size to receive said enlarged portions therein.

15. A magnetic locking device comprising:

a fixed frame, a planar slide slidably supported in said frame for movement along a path of travel in the plane of said slide and provided with a plurality of openings, a plurality of elongated movable magnets extending through said openings and supported for axial movement between two extreme positions along paths of travel fixed relative to said frame perpendicular to said slide, said slide and said magnets being respectively provided with interengaging elements with the element of each of said magnets being in holding relation with the corresponding interengaging element of said slide in one extreme position of said magnet and being out of holding relation relative to said slide in the other extreme position.

16. A device according to claim 15 wherein a plurality of fixed magnets are carried in said frame respectively in alignment with said movable magnets for magnetically urging said movable magnets to one of their extreme positions.

17. A magnetic lock comprising:

a frame, a plurality of elongated movable magnets supported by said frame for longitudinal movement between two extreme positions and along parallel axes fixed relative to said frame, stop means in said frame for limiting movement of said movable magnets between said extreme positions, fixed magnet means adjacent but spaced from one of the corresponding ends of said movable magnets and polarized to repel all of said magnets to an extreme normal position remote from said fixed magnet means, a slide mounted for movement from a normally locked to an unlocked position, said movable magnets and said slide being provided with interengaging elements coacting to lock said slide when at least one of said magnets is in an extreme position in locking relation to said slide, and permitting movement of said slide to said unlocked position when all of said magnets are in extreme positions in nonlocking relation, a card key adapted to be positioned in said frame between said fixed magnet means and said movable magnets and provided with areas of magnetic material adjacent those movable magnets that have been repelled to locking position for attracting the latter to their extreme positions in unlocking relation to said slide.

18. A magnetic lock according to claim 17 wherein said fixed magnet means comprises a plurality of elongated magnets respectively coaxial with said movable magnets.

19. A magnetic lock according to claim 17 wherein a combinating card is positioned in said frame adjacent the opposite corresponding ends of said movable magnets, said combinating card being provided with areas of nonmagnetic material adjacent said movable magnets that have been repelled to locking position thereby permitting said card key to attract such locking magnets to unlocking position.

20. A magnetic lock according to claim 19 wherein said combinating card is provided with areas of magnetic material adjacent said movable magnets that have been repelled to nonlocking position for holding the latter in nonlocking position despite the presence of areas of magnetic material adjacent said nonlocking magnets in said card key.

21. A magnetic lock according to claim 20 wherein said combinating card is provided with an area of nonmagnetic material adjacent one of said movable magnets that has been repelled to nonlocking position, and said card key is provided with a corresponding nonmagnetic area adjacent said one magnet, whereby said one magnet is retained in its repelled nonlocking position despite the presence of said card key.

22. A magnetic lock comprising:

a pair of movable magnets supported for movement along fixed parallel axes, stop means for limiting movement of each of said magnets between two extreme positions, a generally planar slide supported for movement along a path of travel in the plane of said slide and at right angles to said axes, interengaging elements on each of said magnets and on said slide respectively and adapted to coact to lock said slide against movement when one of said magnets is in an extreme position in locking relation with said slide, and adapted to permit movement of said slide when both of said magnets are in an extreme position in unlocking relation with said slide, one of said pair of magnets being normally in one of said extreme positions in locking relation with said slide and the other of said pair of magnets being normally in an extreme position in unlocking relation to said slide, fixed magnet means for urging both of said movable magnets into one extreme normal position, a pair of card keys interposed between said fixed magnet means and said movable magnets for changing the influence of said fixed magnet means on certain of said movable magnets.

23. A lock according to claim 22 wherein said pair of card keys are in superposed relation.

24. A lock according to claim 22 wherein said pair of card keys are positioned alongside each other in substantially coplanar relationship.

25. The method of combinating a magnetic lock in which a fixed magnet means is employed to repel a plurality of parallel movable magnets mounted for reciprocation between two extreme positions with one of their corresponding ends near said fixed magnet means and the other of their corresponding ends remote from said fixed magnet means, said method comprising the steps of:

arranging at least one of said magnets in locking relation and at least two of said magnets in unlocking relation when all of said magnets are repelled to one extreme position away from said fixed magnet means, positioning a nonmagnetic material adjacent the remote end of said locking magnet, positioning a magnetic material adjacent the remote end of one of said unlocking magnets and a nonmagnetic material adjacent the remote end of the other unlocking magnet, positioning a magnetic material adjacent the near end of said locking magnet for attracting the same to the other extreme position and positioning a nonmagnetic material adjacent the near end of the other unlocking magnet, whereby said unlocking magnets are not moved from their normal position, and whereby said other unlocking magnet is attracted to its other extreme position to lock said lock if a magnetic material is positioned adjacent its near end.

26. A magnetically operated device of the character described, comprising:

a frame having a plurality of spaced apart passages formed therein, a movable plate disposed in one of the passages, said plate having a hole formed therein, an elongated magnet extending through said hole, means for guiding said magnet to permit longitudinal movement thereof, said magnet having a collar of larger diameter formed thereon, said collar having a dimension permitting movement through the hole, a card insertable into another of said passages, said card having an area of magnetic material which attracts the magnet and moves it into a position where the collar is either in or out of the hole in the plate to effect either locking or unlocking of the plate, said collar when in the hole locking the plate and when out of the hole permitting movement of the plate.

27. A magnetically operated device of the character described, comprising:

a frame having a plurality of spaced apart passages formed therein, a movable plate disposed in one of the passages, said plate having a hole formed therein, an elongated magnet extending through said hole, means for guiding said magnet to permit longitudinal movement thereof, said magnet having a collar of larger diameter formed thereon, said collar having a dimension permitting movement through the hole, a stationary magnet mounted in the frame in alignment with the movable magnet, said magnet being so polarized as to repel the movable magnet, a card insertable into a passage located between the magnets, said card having an area of magnetic material which attracts the movable magnet and moves it to a position where the collar is either in or out of the hole in the plate to effect either locking or unlocking of the plate, said collar when in the hole locking the plate and when out of the hole permitting movement of the plate.

28. A magnetically operated device of the character described, comprising:

a frame having a plurality of spaced apart passages formed therein, a movable plate disposed in one of the passages, said plate having a plurality of spaced apart holes formed therein, a plurality of elongated magnets extending one through each hole, means for guiding said magnets to permit longitudinal movement thereof, each of said magnets having a collar of larger diameter formed thereon, said collars having a dimension permitting movement through the holes, a card insertable into another of said passages, said card having a plurality of areas of magnetic material which attract one or more magnets, thereby moving the magnets to a position where the collars are either in or out of the holes in the plate to effect either locking or unlocking of the plate, said collars when in the holes locking the plate and when out of the holes permitting movement of the plate.

29. A magnetically operated device of the character described, comprising:

a frame having a plurality of spaced apart passages formed therein, a movable plate disposed in one of the passages, said plate having a plurality of spaced apart holes formed therein, a plurality of elongated magnets extending one through each hole, means for guiding said magnets to permit longitudinal movement thereof, each of said magnets having a collar of larger diameter formed thereon, said collars having a dimension permitting movement through the holes, a card insertable into another of said passages, said card having a plurality of areas of magnetic material which attract one or more magnets, thereby moving the magnets to a position where the collars are either in or out of the holes in the plate to effect either locking or unlocking of the plate, said collars when in the holes locking the plate and when out of the holes permitting movement of the plate, a second card insertable into another of said passages, said card having areas of magnetic material which attract one or more of the magnets thereby rendering said magnets immovable when the first named card is inserted.

30. A magnetically operated device of the character described, comprising:

a frame having a plurality of spaced apart passages formed therein, a movable plate disposed in one of the passages, said plate having a plurality of spaced apart holes formed therein, a plurality of elongated magnets extending one through each hole, means for guiding said magnets to permit longitudinal movement thereof, each of said magnets having a collar of larger diameter formed thereon, said collar having a dimension permitting movement through the holes, stationary magnets mounted in the frame in alignment with the movable magnets, said stationary magnets being so polarized as to repel the movable magnets, a card insertable into the passage located between the magnets, said card having a plurality of areas of magnetic material which attract one or more movable magnets thereby moving the magnets to a position where the collars are either in or out of the holes in the plate to effect either locking or unlocking of the plate, said collars when in the hole locking the plate and when out of the holes permitting movement of the plate.

31. A magnetically operated device of the character described, comprising:

a frame having a plurality of spaced apart passages formed therein, a movable plate disposed in one of the passages, said plate having a plurality of spaced apart holes formed therein, a plurality of elongated magnets extending one through each hole, means for guiding said magnets to permit longitudinal movement thereof, each of said magnets having a collar of larger diameter formed thereon, said collars having a dimension permitting movement through the holes, stationary magnets mounted in the frame in alignment with the movable magnets, said stationary magnets being so polarized as to repel the movable magnets, a card insertable into a passage located between the magnets, said card having a plurality of areas of magnetic material which attract one or more movable magnets thereby moving the magnets to a position where the collars are either in or out of the holes in the plate to effect either locking or unlocking of the plate, said collars when in the hole locking the plate and when out of the holes permitting movement of the plate, a second card insertable into either of said passages, said card having areas of magnetic material which attract one or more of the movable magnets thereby rendering said magnets immovable when the first named card is inserted.

32. In a magnetically operated device of the character described, comprising:

a frame having a plurality of spaced apart passages formed therein, a movable plate disposed in one of the passages, said plate having a keyhole shaped hole formed therein, said hole having a large dimension and a slot-like elongation of smaller dimension, a pin-shaped magnet extending through said hole, means for guiding said magnet to permit longitudinal movement thereof, said magnet having a collar of larger diameter intermediate its ends, said collar having a dimension permitting movement through the large portion of the hole, but preventing movement through the slot portion of the hole, a card insertable into another of said passages, said card having an area of magnetic material which attracts the magnet, thereby moving the magnet to a position where the collar is either in or out of the large portion of the hole in the plate to effect either locking or unlocking of the plate, said collar when in the hole locking the plate and when out of the hole permitting movement of the plate.

33. A magnetic lock comprising:

a frame, a movable member of magnetizatble material, means supporting said member for movement along an axis fixed relative to said frame between two extreme positions, a generally planar slide supported for movement along a path of travel in the plane of said slide and at right angles to said axis, interengaging elements on said member and slide respectively and adapted to coact to lock said slide against movement when said member is in one of said extreme positions, said interengaging elements being out of engagement to unlock said slide when said member is in the other of said extreme positions to permit movement of said slide, a latch bolt, means connecting said slide with said latch bolt for retracting the latter upon movement of said slide.

References Cited by the Examiner

UNITED STATES PATENTS

| | | | |
|---|---|---|---|
| 1,401,130 | 12/1921 | Bohli et al. | 317—201 |
| 2,479,363 | 9/1949 | Jewell | 317—201 |
| 2,732,703 | 1/1956 | Noregaard | 70—211 |
| 2,769,873 | 11/1956 | Noregaard | 70—276 |
| 2,842,876 | 7/1958 | Chicoine et al. | 70—413 |
| 2,966,789 | 12/1958 | Hall | 70—276 |
| 3,111,834 | 11/1963 | Felson | 70—276 |

FOREIGN PATENTS

| | | |
|---|---|---|
| 1,036,702 | 8/1958 | Germany. |

BOBBY R. GAY, *Primary Examiner.*